Patented Jan. 12, 1932

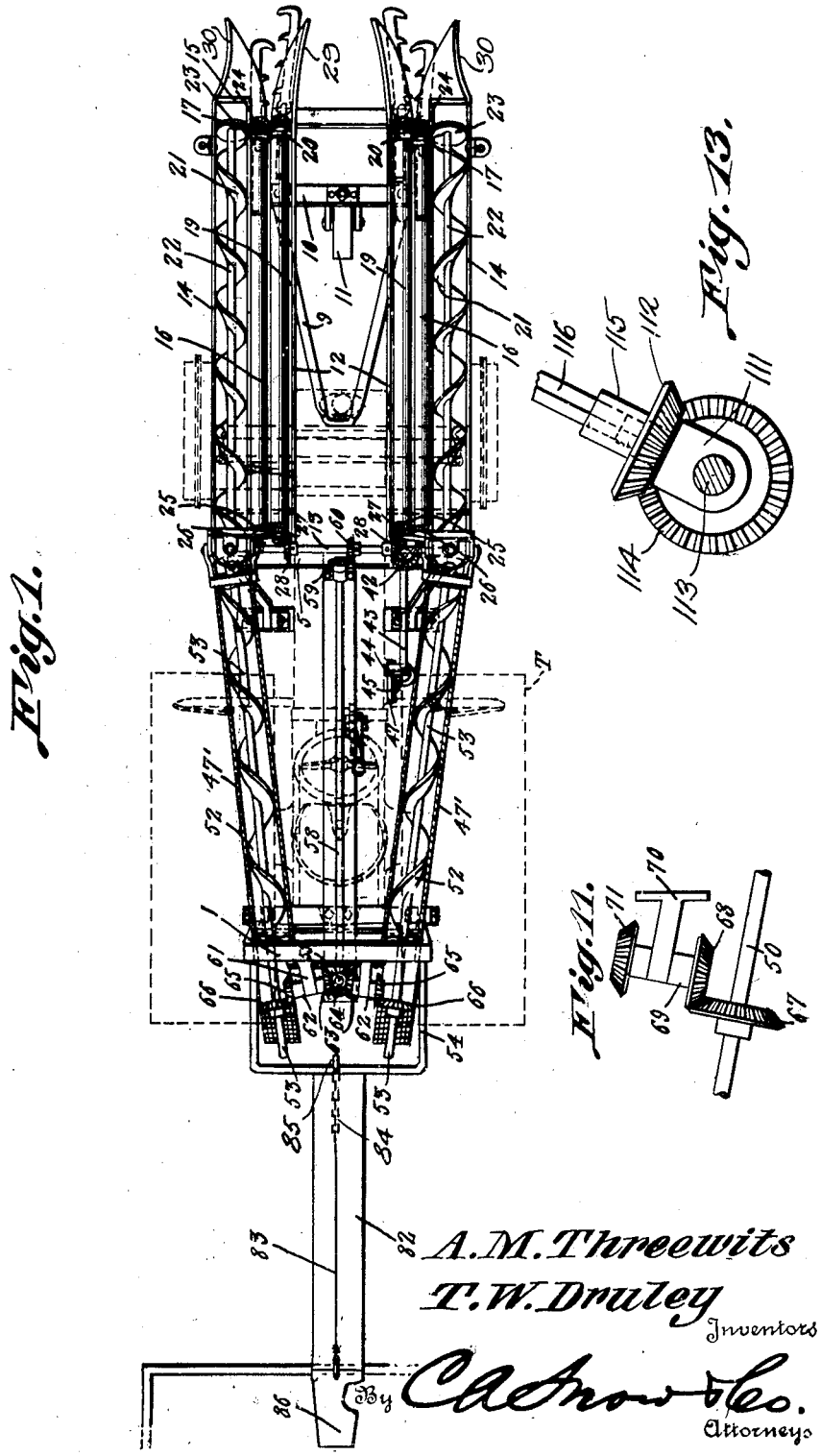

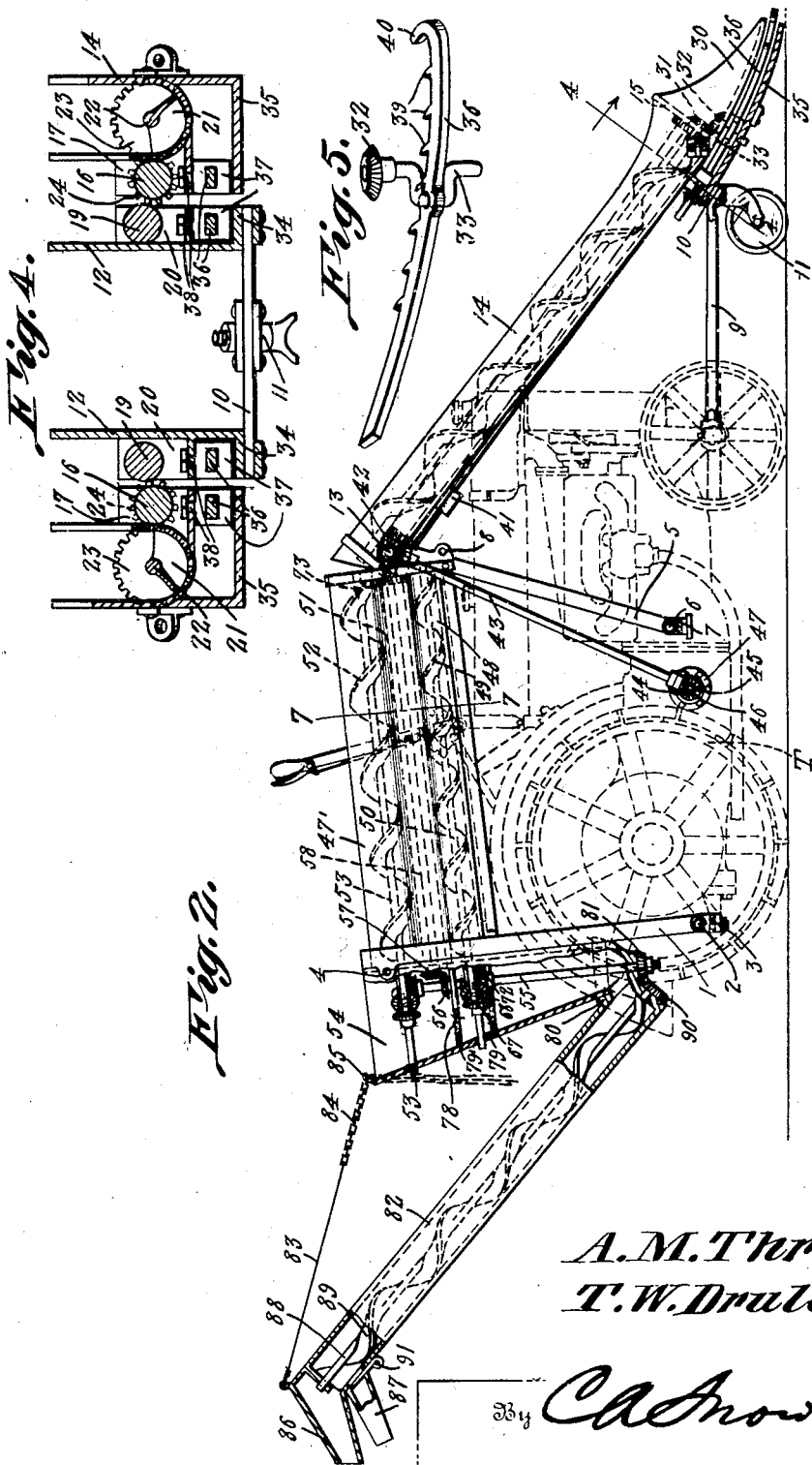

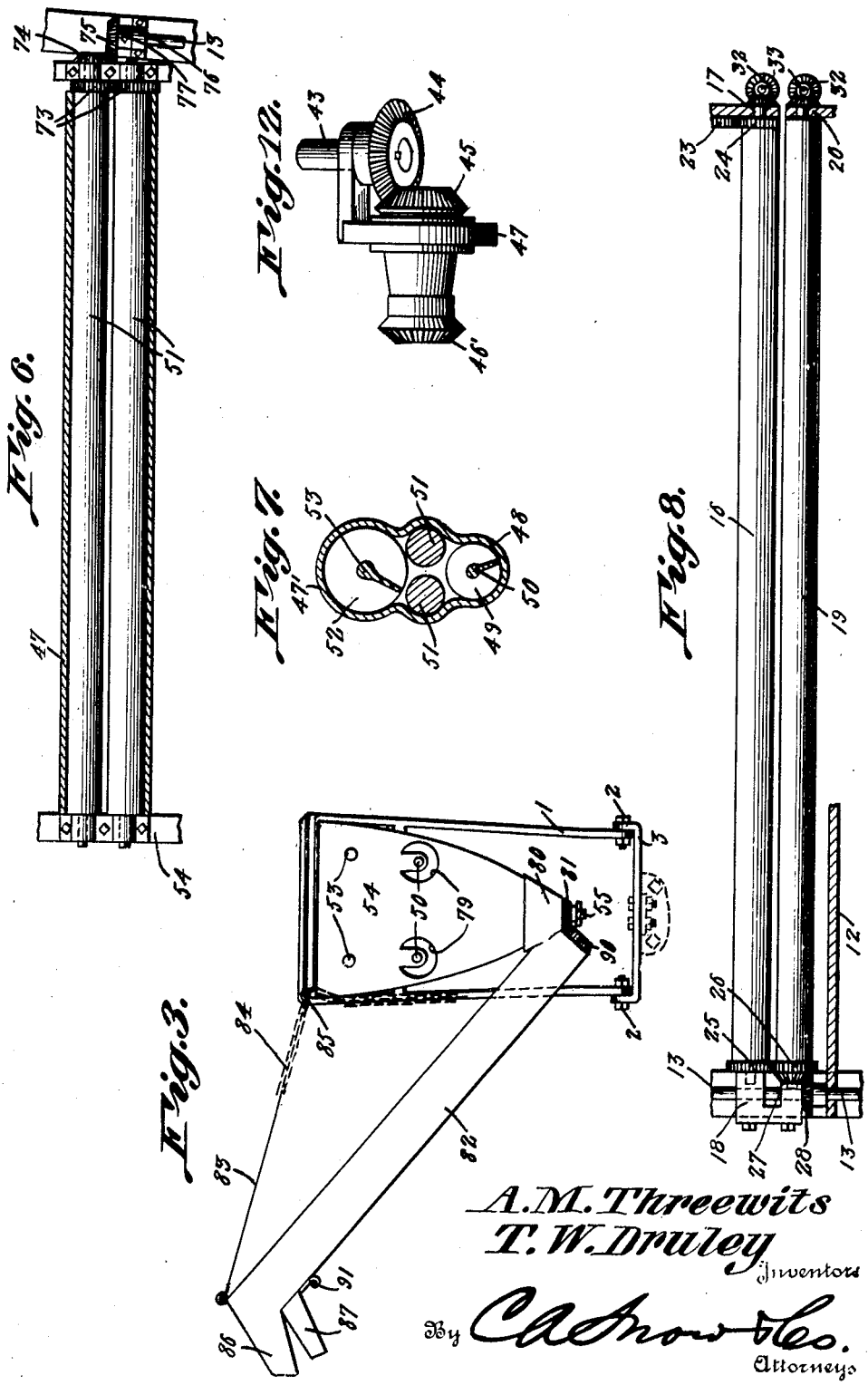

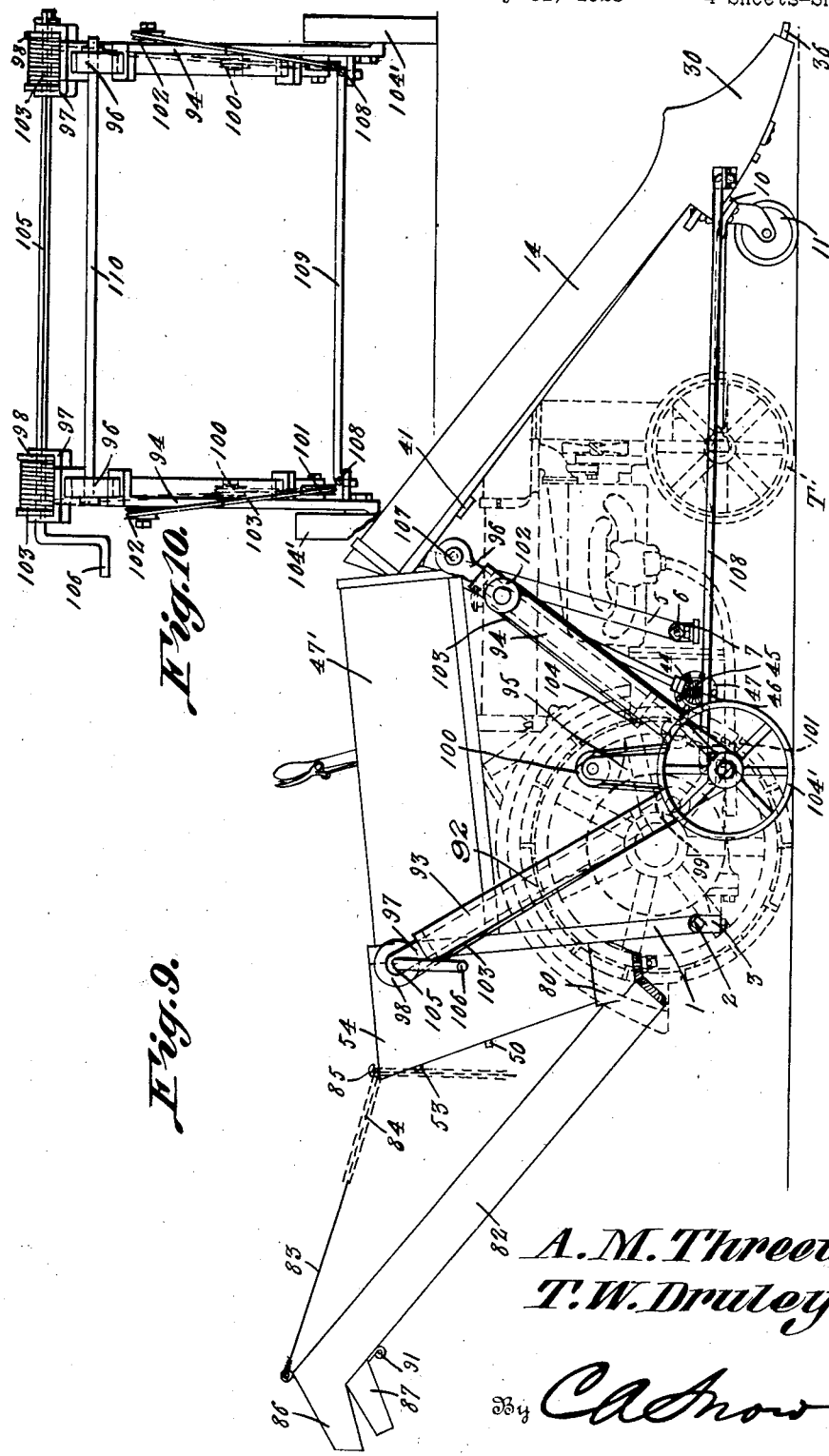

1,840,336

UNITED STATES PATENT OFFICE

ALVIN M. THREEWITS, OF CENTERVILLE, AND THOLLIE W. DRULEY, OF BOSTON, INDIANA

CORN HARVESTING AND HUSKING ATTACHMENT FOR TRACTORS

Application filed May 31, 1928. Serial No. 281,880.

This invention relates to a corn harvesting and husking attachment for tractors, one of the objects being to provide a highly efficient mechanism of this type which is simple in construction, can be applied to tractors of different types, is durable and reliable, and can be operated with maximum safety and economy.

A further object is to provide an attachment of this type which will operate simultaneously on two rows of corn, the said attachment being adapted to balance on the tractor to which it is applied so that it can be handled easily.

A further object is to combine with the mechanism simple and efficient means for gathering the standing corn and feeding it to the snapping rolls.

Another object is to provide an attachment of this character which can be adjusted readily to the tractor to which it is to be applied and has combined with it mechanism for effecting efficient separation of the husks from the ears although, by means under the control of the operator, the ears can be delivered from the machine unhusked, if so desired.

Another object is to provide a means for separating the shelled corn from the husks.

Another object is to provide an attachment of this type which will not injure vegetation growing between the rows of corn, the gathering and snapping mechanism being located in line with the supporting wheels so that after the ears have been removed from the standing stalks, the supporting wheels will travel thereover and mash the stalks to the ground, thereby serving to support the wheels of the tractor while travelling over soft ground.

A further object is to provide simple and efficient means whereby the attachment can be lifted readily from said tractor and moved into a barn or other housing where it is to be stored while the tractor is used for other purposes.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a plan view of the attachment, the position of the tractor thereunder being indicated by broken lines and the housings of the worm conveyors and husking rolls being in section.

Figure 2 is a side elevation of the structure shown in Figure 1 parts being shown in section and the tractor being indicated by broken lines.

Figure 3 is a rear elevation of the attachment, remote parts being removed.

Figure 4 is an enlarged section on line 4—4, Figure 2.

Figure 5 is a perspective view of one of the gathering members and a part of its operating mechanism.

Figure 6 is a plan view of a pair of husking rolls and portions of the mechanisms cooperating therewith, the housing thereof being shown in section.

Figure 7 is an enlarged transverse section through the husking rolls and the adjacent conveyors and through the housing, said section being on the line 7—7, Figure 2.

Figure 8 is a plan view of a pair of snapping rolls, adjacent mechanism being shown.

Figure 9 is a side elevation of the attachment with its running gear connected thereto whereby the attachment can be supported independently of the tractor.

Figure 10 is a front elevation of the running gear.

Figure 11 is a detail view of a portion of the operating mechanism of one of the worm conveyors.

Figure 12 is a detail view of a driving attachment for the tractor.

Figure 13 is a detail view of a modified form of driving mechanism.

Referring to the figures by characters of reference 1 designates the rear supporting yoke of the attachment, the same being adapted to straddle the rear portion of a tractor and to be detachably connected by pins 2 to brackets 3 adapted to be fastened to the seat floor or to the rear hitch of the tractor T. An apertured ear 4 is extended from the upper portion of each side of the yoke 1 and is for the purpose hereinafter described.

A front supporting yoke 5 is detachably connected by pins 6 to brackets 7 which are adapted to be attached to a crossbar on the tractor T or any suitable projecting part. This yoke is also provided, near the upper ends of its sides, with ears 8 having apertures.

Detachably connected to the middle of the front axle of the tractor or to any other suitable part of said mechanism are forwardly diverging braces 9 the front ends of which are connected to a crossbar 10 having a caster 11 pivotally connected to the center thereof. The ends of the bar 10 are attached to longitudinal frame members 12 which are inclined upwardly and rearwardly and pivotally mounted in any suitable manner on a transverse shaft 13 journalled in suitable bearings provided therefor on the upper portion of the yoke 5.

A trough 14 is arranged substantially parallel with each of the frame members 12 and is also connected in any suitable manner to the shaft 13 so as to swing relative thereto. The lower end of each trough is formed with an upstanding wall 15 and mounted for rotation along the inner side of each trough is a snapping roll 16 the lower end of which is journalled in a bearing 17 extending laterally from the lower end portion of the trough while the upper end thereof is journalled in a member 18 mounted to rotate on the shaft 13. Another snapping roll 19 is journalled at its lower end in a suitable bearing 20 extending laterally from the member 12, the upper end of each snapping roll 19 being journalled in the bearing member 18. This is shown particularly in Figure 8. The two snapping rolls 16 and 19 are spaced apart so as to receive standing stalks between them. A screw conveyor 21 is mounted for rotation within each of the troughs 14, each conveyor having a longitudinal shaft 22 provided at its lower end with a gear 23. Each gear 23 meshes with a gear 24 rotatable with the lower end portion of the adjacent snapping roll 16 and each snapping roll 16 receives motion through a gear 25 from a gear 26 at the upper end of the snapping roll 19. Each snapping roll 19 has a bevelled pinion 27 at its upper end which receives motion from a bevelled pinion 28 on the shaft 13. Thus it will be seen that when shaft 13 is actuated the snapping rolls 16 and 19 at the two sides of the machine will be operated simultaneously, the rolls of each pair rotating in opposite directions so as to cooperate to snap the ears from the standing stalks received between the rolls. The rolls 19 are lower than the rolls 16 so that, when the ears are separated from the stalks, they will gravitate off of the rolls 19 laterally into the adjacent troughs 14. In these troughs the screw conveyors 21 are driven by the gears 23 and 24 so as to convey the ears upwardly within the troughs to the upper ends thereof.

Extending forwardly from each frame member 12 is a gathering finger 29 and another gathering finger 30 is extended forwardly from the lower end of each trough 14. The fingers 29 and 30 of each pair diverge forwardly so as to form a throat for receiving the standing stalks and guiding them into the spaces between the pairs of snapping rolls.

Rotatable with and connected to the lower end of each of the snapping rolls 16 and 19 is a pinion 31 and each of these pinions meshes with a pinion 32 provided at the upper end of a crank shaft 33 which extends downwardly a short distance below the snapping rolls and is journalled in suitable bearings provided therefor. Arranged under the fingers 29 and 30 are supporting flanges 34 and 35 carried by the frame members 12 and the trough 14 respectively and extended toward each other although spaced apart along their longitudinal edges to provide clearances for the reception of standing stalks passing to and between the snapping rolls. These flanges provide bearings for the lower ends of the shaft 33 and also constitute guards for gathering arms 36 the rear ends of which are slidably mounted in blocks 37 which are pivotally supported as shown at 38 in Figure 4. The gathering arms are arranged in pairs and those edges which face each other are provided with projecting teeth 39, there being a hook 40 at the forward end of each arm at the same side from which the teeth extend.

At an intermediate point each arm 36 is connected to the crank of one of the shafts 33 as shown in Figure 5. Thus it will be seen that as the snapping rolls operate, motion will be transmitted therefrom through the gears 31 and 32 to the crank shaft and the gathering arms will thus be moved forwardly and backwardly and at the same time be swung laterally. Consequently they will move into engagement with adjacent standing stalks and draw them backwardly toward the space between the gathering fingers 29 and 30, thereby effecting a forced feed. It is to be understood that the frame members 12 and the troughs 14 can be suitably connected near their rear ends by any suitable means, such as a crossbar 41 or the like so as to insure simultaneous up and down movement of these parts.

For the purpose of driving the shaft 13 one of the gears 28 which operates one of the pairs of snapping rolls meshes with a gear 42 at the upper end of a shaft 43. The lower end of this shaft is provided with a gear 44 adapted to receive motion from a gear 45 which is carried by a shaft 46 journalled in a bracket 47 in which shaft 43 is mounted. A gear 46' on shaft 43 is adapted to mesh with a gear (not shown) in the tractor. Thus it will be seen that when said power shaft of the tractor is driven, motion will be transmitted therefrom to the various parts of the harvesting mechanism with the result that as the machine moves forwardly the standing stalks will be gripped and pulled backwardly between the gathering fingers 29 and 30 and subsequently acted on by the snapping rolls which will detach the ears from the stalk and deliver them over the low snapping rolls 16 into the troughs 14 along which they will be elevated by the screw conveyors 21.

As the machine continues to move forward the stalks will be pressed forwardly and downwardly on to the ground and as the wheels of the tractor are located in line with the spaces between the snapping rolls, it will be obvious that these wheels will mash down the stalks so that said stalks can thus be utilized as a means for supporting the wheels on soft soil.

Following the snapping operation the ears are subjected to the action of husking mechanism which also constitutes a part of this invention. Extending rearwardly from the upper end of each of the troughs 14 is a housing 47' which, as shown particularly in Figure 7, includes a lower trough 48 in which is arranged a worm conveyor 49 carried by a longitudinal shaft 50. The forward ends of these housings are supported by the yoke 5 while the rear ends are supported by the yoke 1. A pair of husking rolls 51 is arranged within each housing above the worm conveyor 49 and located above the pair of husking rolls is another worm conveyor 52 carried by a shaft 53. The housing 47 extends along the sides and over the top of the worm conveyor so as to be supported close to the margin thereof.

A hopper 54 is supported by the rear yoke 1 and is arranged where it will receive material delivered by the two worm conveyors. In this hopper is journalled an upwardly extending shaft 55 provided with a gear 56 which receives motion through a gear 57 from a longitudinal shaft 58. This last named shaft, in turn, is driven by a gear 59 which meshes with a gear 60 on the shaft 13. Brackets 61 are connected to the upper portion of the hopper 54 and in each bracket is journalled a short shaft 62 having a gear 63 at its inner end which meshes with a gear 64 at the upper end of the shaft 55. The other end of each shaft 62 has a gear 65 which meshes with a gear 66 secured to the shaft 53 on one of the worm conveyors 52. The rear ends of the two shafts 53 are journalled in the back wall of the hopper 54 as shown particularly in Figure 3.

The rear ends of the shaft 50 of the worm conveyors 49 have gears 67 secured thereto which mesh with gears 68 carried by short shafts 69 journalled in brackets 70 one of which has been shown in Figure 11. Additional gears 71 are carried by the short shafts and are adapted to receive motion from a gear 72 carried by the shaft 55.

The husking rolls 51 are provided at their forward ends with meshing gears 73 and bevelled gear 74 is provided at one end of one of the rolls of each pair, this gear being adapted to receive motion from a bevelled gear 75 mounted on the shaft 13. Gear 75 has a collar 76 in which is a removable pin 77 which serves to couple the gear normally to the shaft 13. When the parts are thus coupled motion will be transmitted from shaft 13 to the husking rolls so that they will be operated to remove husks from the ears and direct the husks downwardly into the troughs 48.

By removing the pins 77 the shaft 13 will rotate without operating the husking rolls, and, therefore, the husking operation will not take place. Under all conditions, however, motion will be transmitted from shaft 13 through the longitudinal shaft 58 to the upstanding shaft 55 and thence to the two worm conveyors 49 and 52. Therefore, if the husking rolls are in operation and the husks are delivered downwardly into the troughs 48 the worm conveyors 49 will carry the husks rearwardly within the troughs and deliver them to the hopper 54. If, however, the husking rolls are not in operation, the unhusked ears will be carried rearwardly by the worm conveyors 52 which will draw them along the husking rollers to the hopper 54.

Each of the lower troughs 48 merges into a tubular extension 78 which extends rearwardly across the hopper 54 and delivers through openings 79 in the rear wall of the hopper as shown in Figure 3. Thus when husks are deposited in the trough 40 they will not be delivered into the hopper 54 but will be carried thereacross and delivered through the openings 79 where any suitable containers, such as bags, or the like, may be supported for gathering them, or, if desired, the husks can be discharged directly on to the ground. The ears of corn conveyed along the husking rolls 51 by the worm conveyor 52 will be delivered into the hopper 54 and gravitate downwardly into the bottom portion thereof. The rear portions of the tubular extension 78 are perforated or otherwise made foraminous, as shown at 79 so that any loose grains of corn that might be separated from the ears by the husking operation will be separated from the husks and fall downwardly into the hopper with the ears of corn.

A collar 80 is mounted for rotation on the lower portion of the hopper and is supported in any suitable manner, as by means of a gear 81 which is detachably held to the lower end portion of the shaft 55. A tubular conveyor housing 82 is extended from the collar and the lower end portion thereof opens through the collar into the lower portion of the hopper. This housing is inclined upwardly away from the hopper and is adapted to be supported by a wire 83 or the like extending from the upper end of the housing and adjustably connected to the upper portion of the hopper 54 by chain 84 engaging hook 85 or the like carried by the hopper. Superposed outlet spouts 86 and 87 are arranged at the upper end of the housing 82. A longitudinal shaft 88 is journalled in the tubular housing 82 and carries a worm conveyor 89. The lower end of this shaft has a gear 90 which meshes with the gear 81 so as to be driven thereby. The outlet spout 86 communicates with the extreme upper end of the housing 82 beyond the end of the worm conveyor 89 while the outlet spout 87 extends from the under portion of the housing 82 near the upper end of the worm conveyor 89. This lower outlet spout is normally closed at its inner end by a gate 91 which can be moved by any suitable means. When the gate is closed all of the material delivered into the lower portion of the housing 82 from the hopper 54 will be carried upwardly by the worm conveyor 89 to the upper outlet spout 86. If, however, it is desired to separate the ears from the loose grains of corn the gate 91 is opened and the small corn grains will thus be delivered into the small outlet spout 87 while the larger ears will be carried across the opening into said spout so as to be delivered into the spout 86. Obviously this elevator housing 82 can be swung to any desired angle relative to the hopper 54 so as to deliver the material to a vehicle or other container located at any point adjacent the rear end of the apparatus.

The apparatus as described is to be mounted on a tractor as already explained and will be driven thereby so as to harvest the ears from the standing stalks, crush the stalks downwardly onto the soil to provide a surface on which the wheels of the tractor can travel, convey the snapped ears to the husking mechanism, remove the husks from the ears, if so desired, deliver the separated husks and ears separately, and also separate the loose grains of corn from the husks. The mechanism can be applied readily to different kinds and sizes of tractors and practically balance on the supporting mechanism so that the tractor can thus be manipulated readily.

For the purpose of removing the attachment from a tractor and supporting it when not in use in such a way that it can be moved from place to place while the tractor is being employed for other purposes, a special carriage is provided. This carriage is shown in detail in Figures 9 and 10. It includes V-shaped side frames 92 made up of upwardly diverging guide arms 93 and 94 and an intermediate upstanding arm 95. A bar 96 is slidably mounted in the arm 94 while a yoke 97 is mounted on the upper end of each arm 93, this yoke being fixedly connected to arm 93 carrying a winding drum 98. A guide pulley 99 is journalled on the lower portion of each arm 93 while another guide pulley 100 is journalled on the upper portion of each arm 95. A third guide pulley 101 is journalled on the lower portion of each arm 94 and another guide pulley 102 is mounted on the upper portion of each arm 94.

A cable 103 is attached to each winding drum 98 and extends downwardly therefrom under the guide pulley 99 and upwardly over guide pulley 100, downwardly under pulley 101, upwardly over guide pulley 102 and downwardly where it is attached to the lower end portion of the slidable bar 96 as shown at 104.

When it is desired to lift the attachment from the tractor so as to be able to move it to a place where it can be conveniently stored while the tractor is being used for other purposes, a frame such as described is set up at either side of the machine, each frame being supported by a wheel 104'. A shaft 105 is inserted through the apertured ears 4 and through the winding drum 98 this shaft being provided with a crank arm 106 whereby it can be rotated readily for the purpose of rotating the drums. The upper ends of the bars 96 are coupled by pins 107 to the apertured ears 8 and tie rods 108 are attached to the lower portions of the frames 92 and to the forward end portions of the troughs 14. Thereafter the attachment is uncoupled from the tractor by detaching the yoke 1 from the bracket 3, detaching yoke 5 from the bracket 7, and detaching the braces 9 from the axle or the parts to which they are connected. Shaft 105 is then rotated and will wind the cables 103 thereon. These cables will pull upwardly on the lower ends of the bars 96 so as to thrust upwardly against the upper end of the yoke 5. Thus the wheels 104' will be swung backwardly to bring the arms 93 nearer to upright position and, as a result, the structure will be lifted relative to the tractor and the weight of the attachment will be taken by the wheels 104 and the caster 11. Thereafter, as will be apparent, the tractor can be withdrawn from under the attachment and a crossbar 109 can be extended transversely to connect the lower portions of the frames while another bar 110 can be extended transversely to connect the upper portions thereof.

With the tractor drawn from under the attachment thus supported, said attachment can be moved to any desired point until it is again to be used at which time the tractor is brought to position thereunder, the attachment is lowered thereonto and the different parts are resecured to the tractor as already explained.

Instead of using the driving mechanism shown in Figure 12 it is to be understood that other forms of mechanism can be employed such as shown for example in Figure 13. This modified structure includes a sleeve 111 on which a gear 112 is journaled, this sleeve being adapted to rotate on the shaft 113 of the power gear 114 carried by the tractor. Gear 112 has a tubular extension 115 in which is telescopically mounted the angular end of a shaft 116 corresponding with the shaft 43 heretofore described. Thus it will be seen that gear 112, which meshes with gear 114, will transmit motion through its extension 115 to shaft 116 and at the same time elongation or shortening of the shaft, due to adjustment of the apparatus on the tractor, can be effected.

What is claimed is:

1. In a machine of the class described, a central husking mechanism, a downwardly and forwardly extending harvesting mechanism for supplying ears to the husking mechanism, a rearwardly extending delivering means for receiving material from the husking mechanism, said harvesting mechanism and delivering means forming the front and back ends of a space beneath the husking mechanism, and a tractor removably mounted in said space for actuating said mechanisms.

2. In a machine of the class described, a central husking mechanism, a downwardly and forwardly extending harvesting mechanism for feeding material to the husking mechanism, and a rearwardly extending delivering means for receiving material from the husking mechanism, said harvesting mechanism and delivering means forming the front and back ends of a space beneath the husking mechanism, a tractor removably mounted in said space, a separable operative connection between said mechanisms and the tractor, and a wheel-supported means at the sides of the tractor-receiving space for supporting the weight of said mechanisms while being disconnected from or operatively connected to the tractor.

3. In a machine of the class described, a central husking mechanism, a downwardly and forwardly extending harvesting mechanism for feeding material to the husking mechanism, and a rearwardly extending delivering means for receiving material from the husking mechanism, said harvesting mechanism and delivering means forming the front and back ends of a space beneath the husking mechanism, a tractor removably mounted in said space, a separable operative connection between said mechanisms and the tractor, wheel-supported means at the sides of the tractor-receiving space for supporting the weight of said mechanisms while being disconnected from or operatively connected to the tractor, and means for adjusting the wheel-supported means to elevate the husking and delivering mechanisms thereby to permit movement of the tractor into and out of position in the space beneath the husking mechanism.

4. In a machine of the class described laterally spaced sets of husking mechanisms, downwardly and forwardly extending laterally spaced harvesting mechanisms for supplying ears to the respective husking mechanisms, a rearwardly extending delivering means for receiving material from the spaced husking mechanisms, a space being provided beneath the husking mechanism and between and back of the harvesting mechanisms, a tractor removably mounted in said spaces for supporting said mechanisms, and a separable drive between the tractor and said mechanisms.

In testimony that we claim the foregoing as our own, we have hereto affixed our signatures.

ALVIN M. THREEWITS.
THOLLIE W. DRULEY.